United States Patent [19]

Broadbent

[11] Patent Number: 4,545,611
[45] Date of Patent: Oct. 8, 1985

[54] VAN BODY WITH PLEATED SIDES
[75] Inventor: Edward G. Broadbent, Sandbach, England
[73] Assignee: Tautliner Inc., Indianapolis, Ind.
[21] Appl. No.: 448,157
[22] Filed: Dec. 9, 1982
[51] Int. Cl.[4] .............................................. B60J 5/06
[52] U.S. Cl. .................................... 296/181; 296/155; 296/183; 160/84 R; 160/186
[58] Field of Search .............. 296/181, 187, 191, 203, 296/183, 31 R, 31 P, 155; 160/84 H, 84 R, 186

[56] References Cited

U.S. PATENT DOCUMENTS

| 2,234,685 | 3/1941 | Vance | 160/84 R X |
| 2,573,441 | 10/1951 | Hess | 160/84 R |
| 2,891,612 | 6/1959 | Johnson et al. | 160/84 R |
| 3,709,552 | 1/1973 | Broadbent | 296/183 |
| 4,014,377 | 3/1977 | Kochanowski | 160/186 |
| 4,230,171 | 10/1980 | Baker, Sr. | 160/84 R |
| 4,256,164 | 3/1981 | Agcaoili | 160/186 |
| 4,397,347 | 8/1983 | Brabant | 160/84 R |

FOREIGN PATENT DOCUMENTS

| 1262880 | 5/1970 | United Kingdom | 296/183 |
| 1542811 | 3/1979 | United Kingdom | 296/183 |
| 1542812 | 3/1979 | United Kingdom | 296/183 |
| 2049568 | 10/1980 | United Kingdom | 296/181 |

Primary Examiner—Robert B. Reeves
Assistant Examiner—Russell D. Stormer
Attorney, Agent, or Firm—Sughrue, Mion, Zinn, Macpeak and Seas

[57] ABSTRACT

An urban delivery side-access vehicle has a van body with opposed open sides, each of which is closable by a slidable door structure consisting of two solid end doors interconnected and bridged by a foldable curtain. The door structure is suspended from an overhead track by runners and engages the platform of the van body by hooks. The curtain is panelled and contains strips for biasing it into an outward pleated configuration when the door structure is opened.

3 Claims, 7 Drawing Figures

U.S. Patent   Oct. 8, 1985   Sheet 1 of 3   4,545,611
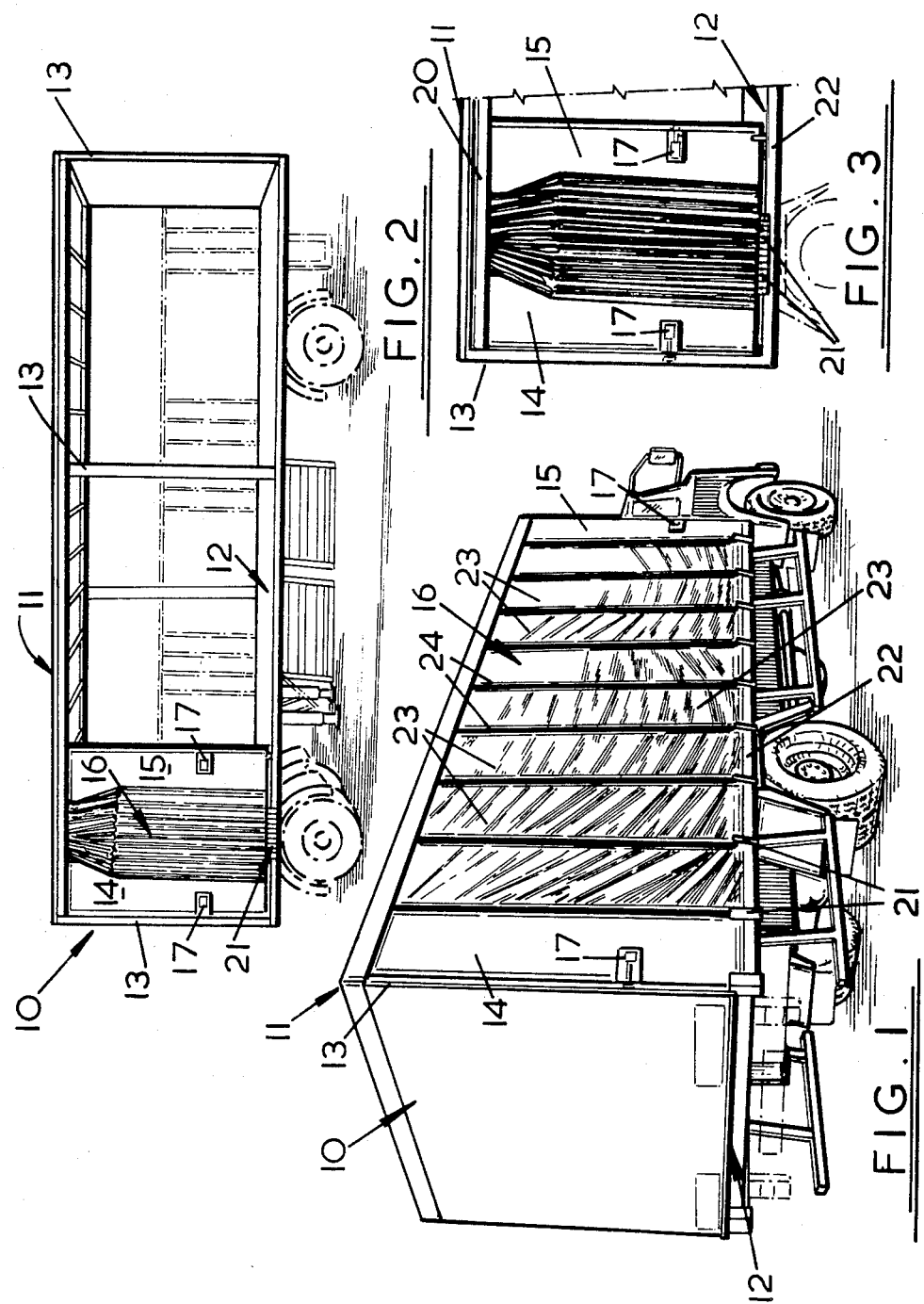

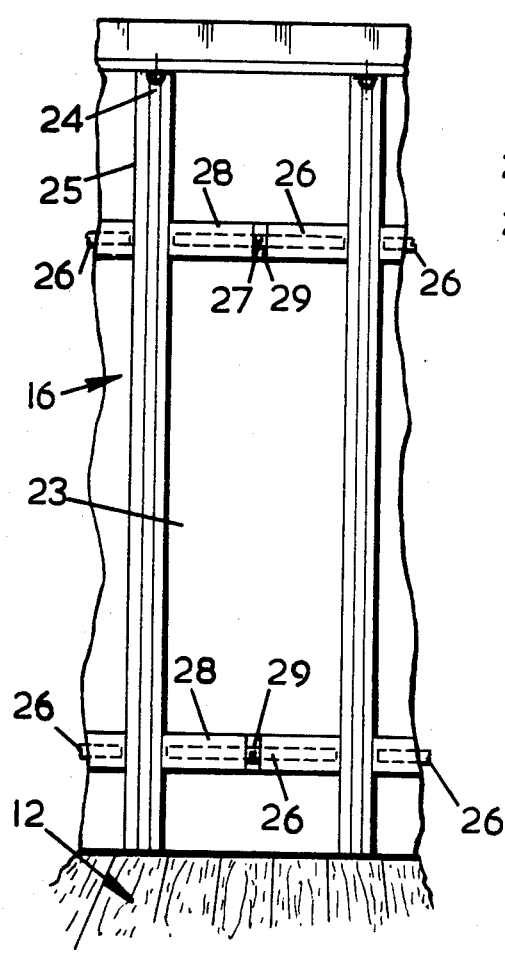
FIG. 5
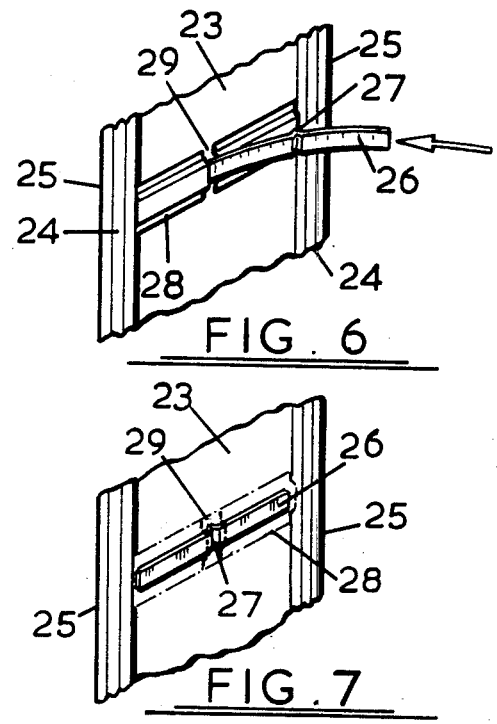
FIG. 6
FIG. 7

VAN BODY WITH PLEATED SIDES

BACKGROUND OF THE INVENTION

This invention relates to van bodies and is particularly concerned with side-access van bodies.

The term "van body" is used herein and in the claims to mean any body which has a bed for supporting cargo to be transported and a roof disposed above such bed and which is, or is intended to be mounted, on wheels to provide the trailer portion of an articulated road vehicle, the body portion of a non-articulated road vehicle, or the body portion of a railway freight train. The access sides may be the vertical lateral or end sides of the body but will usually be the two parallel lateral sides of the van body.

A side-access van body is generally provided with a sliding door closure structure which may be a solid door structure or a curtain structure as for example is disclosed in U.S. Pat. No. 3,709,552.

The present invention is especially adapted for use on vehicles which are used for urban deliveries.

With an urban delivery side-access vehicle having a solid sliding door structure which usually consists of two doors each adapted to be slid to overlap the other to provide access to the van body it is a drawback that only half of the side can be opened at any one time so that if a load to be discharged extends over more than half the length of the van body then, if it is of a unitary nature, it needs to be maneuvered out through the open half of the van body side, or if it is made up of a number of units it usually requires, after part removal, both doors to be slid to the other end of the van body to allow discharge of the rest of the load. It is also a disadvantage that due to the size of the doors they tend to be relatively heavy and so require the use of considerable energy on the part of the van driver to open and close them.

With an urban delivery side-access vehicle of a curtain-sided nature such as disclosed in the aforesaid Patent if it is a drawback that to provide access one end of the curtain and the various buckles must be released before access can be achieved and, after unloading, the end must be secured and all the buckles re-fastened. This is time-consuming and is unsatisfactory when the vehicle is being used around a town or city for "stop-start" urban delivery purposes.

SUMMARY OF THE INVENTION

It is an object of the present invention to provide an urban-delivery side-access vehicle having a van body which obviates or mitigates the aforesaid drawbacks.

According to the invention there is provided a van body having an open side for access and comprising a sliding door structure for closing said open side, the sliding door structure comprising two solid slidable end doors connected and bridged by a sliding flexible curtain. The doors and curtain are preferably suspended by runners from a track at the van body roof and have at their bottom robust hooks which engage an edge of a side rail of the van body bed.

The doors are preferably normally retained in their end positions by over-centre latches engaging end pillars of the van body thereby stretching and horizontally tensioning the curtain therebetween.

The curtain is preferably divided into panels by vertical tubes housed in sleeves in the curtain and extending between a runner and its corresponding hook.

Each solid door, in length, is substantially less than half the length of the open side. Each solid door is preferably the same length as a curtain panel.

In use, to load or unload the van body, one end door is released and pushed towards the other end door, the curtain pleating or folding at the vertical tube locations. With a view to ensuring that the curtain always pleats or folds outwardly, since a mixture of inward and outward pleating or folding is undesirable as it increases resistance to movement of the sliding door and moreover the inner pleats or folds may catch on the cargo, or a cargo-restraint net or metal grid, if suchis used, with risk of curtain damage, each curtain panel has secured thereto a biasing strip tending to urge the panel outwards of the van body as the curtain pleats or folds.

Preferably, each curtain panel has two biasing strips, one at or near the bottom of the panel and the other towards the top of the panel, say, for example, one fifth of the panel height from the top.

Each biasing strip preferably extends between adjacent vertical tubes and is preferably housed in a pocket on the inside of the curtain.

Each biasing strip is preferably a strip of plastics material, slightly curved to give the required bias.

Preferably, the bias of the plastics strip is increased by suitably crimping or kinking the plastics strip at its centre.

BRIEF DESCRIPTION OF THE DRAWINGS

An embodiment of the present invention will now be described, by way of example, with reference to the accompanying drawings, in which:

FIG. 1 is a perspective view of a side-access vehicle according to the present invention;

FIG. 2 is a side view with one side open and showing the pleated or folded curtain;

FIG. 3 is a view similar to FIG. 2 but only of the open and closed doors and the open curtain;

FIG. 5 is a diagrammatic view of the inside of the curtain; and

FIGS. 6 and 7 are detail views of a biasing strip being inserted into, and inserted in, its pocket.

DETAILED DESCRIPTION OF THE PREFERRED EMBODIMENT

Figure 4:
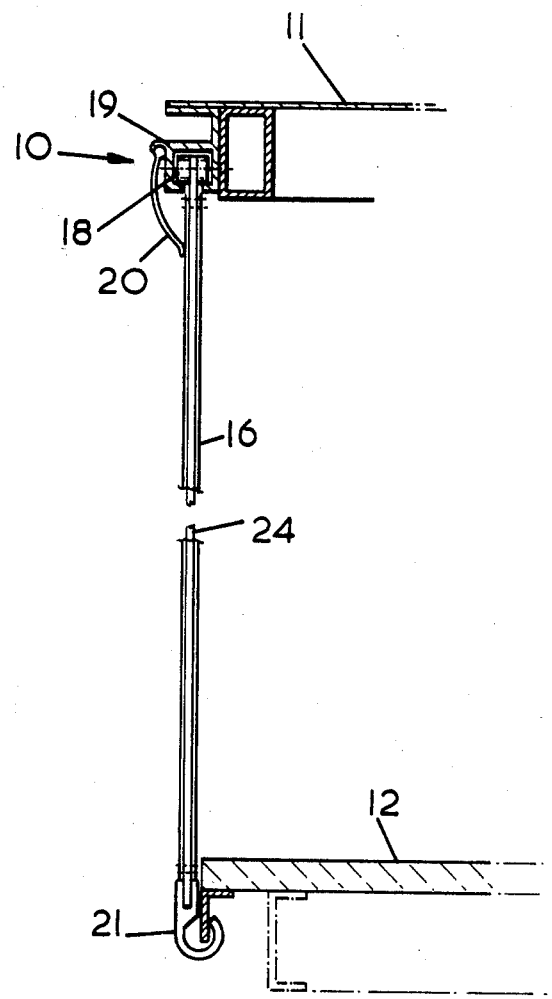
FIG. 4 is a diagrammatic section through the van body side.

The vehicle has a van body 10 with a roof 11 supported above a cargo bed 12 by pillars 13. Each parallel lateral side is closable by two short solid end slidable doors 14 and 15 connected to and bridged by a sliding curtain 16.

Each door 14 and 15 is releasably secured in its end position in relation to an end pillar 13 by an over-centre latch 17. An example of a convenient form of such a latch is disclosed in United Kingdom Pat. No. 1 600 312. However, it will be manifest to those skilled in the art that any other suitable form of latch or lock may be employed.

The doors 14 and 15 and the curtain 16 are suspended by runners 18 of any convenient form from an overhead track 19 concealed behind a valance 20.

The doors 14 and 15 and the curtain 16 have at their bottoms robust plastics hooks 21 which slidably engage an edge of a side rail 22 of the cargo bed 12.

The curtain 16 is divided into vertical panels 23 by vertical tubes 24 housed in sleeves 25 in the curtain 16, which tubes 24 extend between a runner 18 and its corresponding hook 21.

To gain access to the van body, one over-centre latch 17 is released and the appropriate door 14 or 15 is pushed towards the other door 15 or 14, the curtain 16 pleating or folding along the line of the vertical tubes 24.

To ensure that this pleating or folding of the curtain 16 is always outwards of the van body 10, as is shown in FIGS. 2 and 3, each panel 23 has a pair of biasing strips 26 formed of slightly curved plastic strips crimped or kinked at their centers as indicated at 27.

Each biasing strip 26 is housed in a pocket 28 briding adjacent sleeves 25 and having a central slit or cut-out 29 to allow the strip 26 to be inserted. One end of the biasing strip 26 is inserted as shown in FIG. 6 and then the strip 26 is bent inwardly of the curtain 16 to bring its other extremity into line with the slit or cut-out 29, the other half of the strip 26 being then slid into the pocket 28. The biasing strips 26 are, of course, inserted with their curvature and kink 27 directed to the outer face of the curtain 16.

These biasing strips 26 ensure outward pleating or folding of the curtain 16 when the van body side is being opened.

One strip 26 is at or near to bed 12 of the van body while the other is approximately one fifth of the height from the roof 11.

There may be only one biasing strip or more than two per curtain panel 23.

Other means of securement may be employed.

What is claimed is:

1. A van body (10) having an open side to provide access to the van body interior for cargo loading and unloading and comprising two end pillars (13), an overhead track (19) bridging and connecting upper ends of the end pillars, a bottom rail (22) bridging and connecting lower ends of the end pillars, the end pillars, overhead track and bottom rail defining the open access side of the van body, and a side closure assembly mounted on the van body for closing the open access side thereof and being movable to partially open said access side, the side closure assembly comprising:
   (a) a pair of solid end doors (14, 15) extending between the overhead track and the bottom rail;
   (b) fastening means (17) on each end door and the adjacent end pillar for releasably securing the end door to the end pillar;
   (c) a flexible curtain (16) connecting the two end doors and also extending between the overhead track and the bottom rail;
   (d) a plurality of horizontally-spaced, vertical sleeves (25) formed in the flexible curtain and extending the full height thereof;
   (e) a plurality of rigid members (24) individually housed in each vertical sleeve to define successive panels (23) of the flexible curtain;
   (f) a plurality of runners (18) individually connected to a top of each end door and a top of each rigid member and located in the overhead track for movement therealong;
   (g) a plurality of hooks (21) individually connected to a bottom of each end door and a bottom of each rigid member and slidably engaging the bottom rail in a non-releasable manner for movement therealong;
   (h) at least one pocket (28) formed in each curtain panel between a top and a bottom thereof and extending between and normal to two sleeved rigid members defining the panel; and
   (i) a resilient biasing strip (26) housed in each pocket and configured to urge the curtain panel outwards of the van body for compelling the flexible curtain to form plates when the side closure assembly is moved to open the access side of the van body, each pocket being closed at each end and having a central slit (29) through which the resilient biasing strip may be easily inserted into the pocket and removed therefrom if damaged or broken, one end at a time, the egress of the biasing strip being resisted during use.

2. A van body as claimed in claim 1, in which the biasing strip is a bendable plastic strip of substantially the same length as the pocket and which has a longitudinally curved configuration with a central crimp (27) to bias the accommodating curtain panel outwards when the biasing strip is housed in its pocket with its convex surface directed outwards of the van body.

3. A van body as claimed in claim 2, comprising two parallel, vertically-spaced pockets formed in each curtain panel spaced from the top and bottom of the curtain, and a resilient biasing strip housed in each pocket.

* * * * *